(12) United States Patent
Couppee et al.

(10) Patent No.: US 12,409,826 B2
(45) Date of Patent: Sep. 9, 2025

(54) TRAILER BRAKE CONTROL MODULE

(71) Applicant: ZF CV Systems Europe BV, Brussels (BE)

(72) Inventors: Ulrich Couppee, Coppenbrügge (DE); Lukasz Drelich, Czestochowa (PL); Robert Otremba, Ronnenberg (DE); Karl-Heinz Riediger-Janisch, Hannover (DE); Pawel Swiatek, Wroclaw (PL); Leszek Toma, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 173 days.

(21) Appl. No.: 18/032,575

(22) PCT Filed: Oct. 21, 2020

(86) PCT No.: PCT/EP2020/079556
§ 371 (c)(1),
(2) Date: Apr. 19, 2023

(87) PCT Pub. No.: WO2022/083855
PCT Pub. Date: Apr. 28, 2022

(65) Prior Publication Data
US 2023/0398973 A1  Dec. 14, 2023

(51) Int. Cl.
*B60T 15/20* (2006.01)
*B60T 13/26* (2006.01)
*B60T 13/68* (2006.01)

(52) U.S. Cl.
CPC .......... *B60T 15/203* (2013.01); *B60T 13/263* (2013.01); *B60T 13/683* (2013.01)

(58) Field of Classification Search
CPC ........ B60T 8/266; B60T 8/362; B60T 8/1708; B60T 13/683; B60T 13/66; B60T 13/265;
(Continued)

(56) References Cited

U.S. PATENT DOCUMENTS 4,264,108 A    4/1981  Bordoni
4,768,840 A *  9/1988  Sullivan .................. B60T 17/22
                                        303/9.62
(Continued)

FOREIGN PATENT DOCUMENTS

CN    110431054 A    11/2019
CN    110446634 A    11/2019
(Continued)

OTHER PUBLICATIONS

European Patent Office, Rijswijk, Netherlands, International Search Report of International Application No. PCT/EP2020/079556, Mailed Jul. 15, 2021, 3 pages.
(Continued)

*Primary Examiner* — Robert A. Siconolfi
*Assistant Examiner* — San M Aung
(74) *Attorney, Agent, or Firm* — Dickinson Wright PLLC

(57) ABSTRACT

A trailer brake control module (300a; 300b; 300c) for a towing vehicle (502) facilitating braking of a towed vehicle or trailer (504) includes a pressure supply port (P11), a trailer control pressure port (P22), a primary control port (P42) for receiving either directly and/or indirectly a control brake pressure for operating the trailer brake control module (300a; 300b; 300c). The primary control port (P42) receives the control brake pressure from a pneumatically operated pressure medium, a pneumatic control pressure line (308.1) provides alternative control brake pressure for operating the trailer brake control module (300a; 300b; 300c), wherein the pneumatic control pressure line (308.1) receives the alternative control brake pressure from an electronically operated pressure medium, and a relay valve (310) is activated using either the control brake pressure received at the primary control port (P42), or the alternative control brake pressure from the pneumatic control pressure line (308.1).

20 Claims, 9 Drawing Sheets

(58) Field of Classification Search
CPC ...... B60T 13/263; B60T 15/027; B60T 15/18; B60T 15/181; B60T 15/203; B60T 17/22; B60T 2230/06
USPC .......................................................... 303/7
See application file for complete search history.

(56) References Cited

U.S. PATENT DOCUMENTS

| | | | | |
|---|---|---|---|---|
| 4,804,234 | A | * | 2/1989 | Gee .................... B62D 53/0807 303/9.62 |
| 4,818,035 | A | * | 4/1989 | McNinch, Jr. ............ B60T 8/74 303/9.69 |
| 2008/0030068 | A1 | * | 2/2008 | Bensch ................. B60T 13/588 303/17 |
| 2015/0239441 | A1 | * | 8/2015 | Klostermann ........ B60T 11/108 303/7 |
| 2018/0304871 | A1 | * | 10/2018 | Eckert ................. B60T 8/17554 |
| 2020/0047730 | A1 | * | 2/2020 | Van Thiel ............. B60T 15/027 |
| 2020/0094805 | A1 | | 3/2020 | Riley et al. |
| 2020/0139953 | A1 | | 5/2020 | Dombek et al. |
| 2020/0223414 | A1 | * | 7/2020 | Brütt ..................... B60T 13/263 |

FOREIGN PATENT DOCUMENTS

| | | |
|---|---|---|
| CN | 110446637 A | 11/2019 |
| DE | 102018123750 A1 | 3/2020 |

OTHER PUBLICATIONS

English Translation of Chinese Office Action issued by the Chinese Patent Office (CPO) on Jun. 20, 2025 (Notification of First Office Action and Search Report), 9 pages.

* cited by examiner

TRAILER BRAKE CONTROL MODULE

FIELD

The present disclosure relates to trailer brake control modules or trailer control valves. In particular, the present disclosure relates to a trailer control valve utilized in a modular brake control system of a towing vehicle. The trailer control valve can be operated using pressurized air.

Throughout the text explaining the present disclosure, the terms—towing vehicle, towed vehicle, or trailer are repeatedly used in a variety of contexts. For the sake of understanding, it is noted that the term "towing vehicle" can refer to e.g., a truck, tractor, or any other vehicle which includes a primary propulsion system e.g., an engine for moving the vehicle. The term "towed vehicle" can refer to a trailer, a semi-trailer, or any extension of the towing vehicle with at least a pair of wheels included in it.

BACKGROUND

The existing conventional braking systems include a variety of techniques to manage the difference in deceleration rates between a towing vehicle and a trailer. This is necessary, for instance, to prevent over-braking and/or under-braking of the trailer in comparison to the towing vehicle.

However, the role of trailer control valves in achieving a balance in the deceleration rates between the towing vehicle and the trailer is seldom provided the attention it deserves.

One such conventional trailer control valve with means to balance the deceleration rates with a pneumatic valve such as a predominance valve attached to the side of the trailer control valve is explained in the patent publication U.S. Pat. No. 4,264,108A.

Furthermore, conventional trailer control valves helping to meet the requirements of Regulation No. 13 of Economic Commission for Europe of the United Nations (UN/ECE), in particular stipulations under S. No. 5.2.1.28 are already known.

There is however still a need to further improve and/or to provide effective alternatives to the existing trailer control valves.

SUMMARY

In accordance with an embodiment, a trailer brake control module for a towing vehicle facilitating braking of a towed vehicle or trailer is disclosed. The trailer brake control module comprises a pressure supply port, a trailer control pressure port, a primary control port for receiving either directly or indirectly a control brake pressure for operating the trailer brake control module, wherein the primary control port receives the control brake pressure from a pneumatically operated pressure medium. The trailer brake control module further comprises a pneumatic control pressure line providing alternative control brake pressure for operating the trailer brake control module, wherein the pneumatic control pressure line receives the alternative control brake pressure from an electronically operated pressure medium, and a relay valve is activated using either the control brake pressure received at the primary control port, or the alternative control brake pressure from the pneumatic control pressure line, wherein on activating the relay valve, the pneumatic pressure received at the pressure supply port is connected to the trailer control pressure port, wherein the trailer brake control module is additionally provided with a braking rate (z) rebalancing unit so that the difference of the braking rate between said towing vehicle and said trailer is maintained within a permissible threshold range.

The presence of the braking rate rebalancing unit within the trailer brake control module enables the rebalancing of the difference in the individual braking rate enabled at the towing and towed vehicles. This rebalancing is necessary to prevent accidental effects during the application of brakes in the towing and towed vehicles such as jack-knifing.

In accordance with a preferred embodiment, the braking rate (z) rebalancing unit can be or is an electronic unit or a mechanical unit (predominance valve) or an electro-mechanical valve unit explained in one or more aspects of the present disclosure as "electronically operated sub-unit (W, 304, 306)" in a trailer brake module (300a) or "mechanically operated sub-unit (PRV)" in a trailer brake module (300b or 300c).

Furthermore, in accordance with an embodiment of the present disclosure, the trailer brake control module consists of the following ports: the primary control port, a parking brake control port, the pressure supply port, the trailer control pressure port, a trailer supply pressure port, and a pressure relief port at the housing of the trailer brake module. This should be read in comparison with what is known in prior art e.g., as displayed in FIG. 2 where an additional port P41 is provided. Thus, conventional trailer brake control modules include one more port P41 which entails one more chamber for receiving the pressurized air from P41 and an additional control piston therein. Such components are rendered unnecessary with the trailer brake module consisting of the ports mentioned above thereby having a positive effect on the costs of the device.

In accordance with an embodiment of the present disclosure, the trailer brake control module further comprises a double check or select-high valve for supplying one of the control brake pressure and the alterative control brake pressure depending on the magnitude of each of the brake pressures, wherein the brake pressure which has the higher magnitude is supplied to the relay valve. For instance, the presence of the double check valve directly contributes to the number of control pressure ports necessary for the trailer brake control module. As can be realized, the double check valve enables connecting the relay valve with the pressure of higher magnitude from either the control brake pressure received at the primary control port, or the alternative control brake pressure from the pneumatic control pressure line. Thus, the need for having an additional redundant pneumatic control port, should the connection to the primary control port fail, is eliminated.

In accordance with the present embodiment, said brake rate rebalancing unit includes a mechanically operated sub-unit which is either coaxially positioned in relation to a central axis (Y-Y') of the trailer brake control module or is positioned perpendicular to said central axis (Y-Y'), wherein said mechanically operated sub-unit is at least vertically above the relay valve and/or at the same horizontal level or above the horizontal level of the trailer control pressure port taking the central axis (Y-Y') as reference.

The mechanically operated sub-unit provides a trailer brake control module which is hybrid in nature, in which said brake control module can work under an electronic control (e.g., via operating the solenoid valves), but on the other hand cannot or need not block out the pneumatic driver control using e.g., the mechanically operated sub-unit.

In an embodiment, the trailer brake control module further comprises a pneumatically controlled metering valve connecting the pressure supply port and a trailer supply pressure port, wherein said metering valve operates in first and second positions, wherein in the first position, the metering valve connects the pressure supply port and the trailer supply pressure port through a throttled flow orifice, and wherein in the second position, the metering valve connects the pressure supply port and the trailer supply pressure port in an invariable and open manner such that the whole of the pneumatic pressure received at the pressure supply port is transmitted to the trailer supply pressure port. In combination with the above embodiment, preferably wherein the pneumatically controlled metering valve is held in the second position with the help of at least partly pre-existing pressure in the trailer supply pressure port and/or a spring.

In accordance with yet another embodiment, the trailer brake control module, of any one of the above embodiments, further comprises a first electronically controlled solenoid valve whose inlet is connected to the pressure supply port and outlet is selectively connected to the relay valve, wherein said outlet supplies the alternative control brake pressure. For instance, the electronically controlled solenoid valve enables electronically implemented dynamic braking functions such as EBS (Electronic Brake System), ASR (Anti-Slip Regulation), ESP (Electronic Stability Program) and others while operating the trailer brake control module.

In accordance with one more of the above embodiments, the outlet of the first electronically controlled solenoid valve carrying the alternative control brake pressure is connected to a first inlet of the double check or select-high valve, wherein the double check or select-high valve enables the selective connection of the outlet with the relay valve when the pressure supplied at the outlet is of higher magnitude than the pressure at the primary control port.

In accordance with any one of the above embodiments, the magnitude of the pressure received at the primary control port is proportional to the driver's brake demand.

The trailer brake control module, in accordance with any one of the above embodiments, provides that the pressure at the trailer brake control port is measured using a Pulse Width Modulation (PWM) based pressure sensor. The technical purpose and/or advantage of using the PWM based pressure sensor is to provide for "functional safety" according to ISO standard 26262.

In accordance with one or more embodiments, the trailer brake control module further comprises a first pneumatic control chamber to which the primary control port is connected. Furthermore, in the same or different embodiment, the trailer brake control module further comprises a first control piston separating the first pneumatic control chamber and an additional volume (AV), and wherein the first control piston integrally comprises a fluid flow path indirectly connecting the trailer control pressure port and the additional volume (AV).

Furthermore, a pneumatic brake system comprising the trailer brake control module of any one of the abovementioned embodiments is provided. The system further comprises an electronic control unit connected to the trailer brake control module to perform brake functions with or without driver brake demand. In the same or different embodiment, the pneumatic brake system is disclosed, wherein the electronic control unit controls the trailer brake control module such that braking rate (z) rebalancing unit achieves the maintenance of the difference of the braking rate between said towing vehicle and said towed vehicle within said permissible threshold range.

Finally, a commercial vehicle or an autonomous vehicle comprising the pneumatic brake system of the above embodiment is disclosed.

For a more complete understanding of the present disclosure, the present disclosure will now be described in detail with reference to the accompanying drawing. The detailed description will illustrate and describe what is considered as a preferred embodiment of the present disclosure. It should of course be understood that various modifications and changes in form or detail could readily be made without departing from the spirit of the present disclosure. It is intended that the present disclosure may not be limited to the exact form and detail shown and described herein, nor to anything less than the whole of the present disclosure disclosed herein and as claimed hereinafter. Further the features described in the description, the drawing and the claims disclosing the present disclosure may be essential for the present disclosure considered alone or in combination. In particular, any reference signs in the claims shall not be construed as limiting the scope of the present disclosure. The wording "comprising" does not exclude other elements or steps. The wording "a" or "an" does not exclude a plurality. The wording, "a number of" items, comprises also the number one, i.e. a single item, and further numbers like two, three, four and so forth.

For identical or equivalent items or items of identical or equivalent function(s) same reference marks or signs are used. The corresponding features are generally referred to the description.

DETAILED DESCRIPTION

Figure 1:
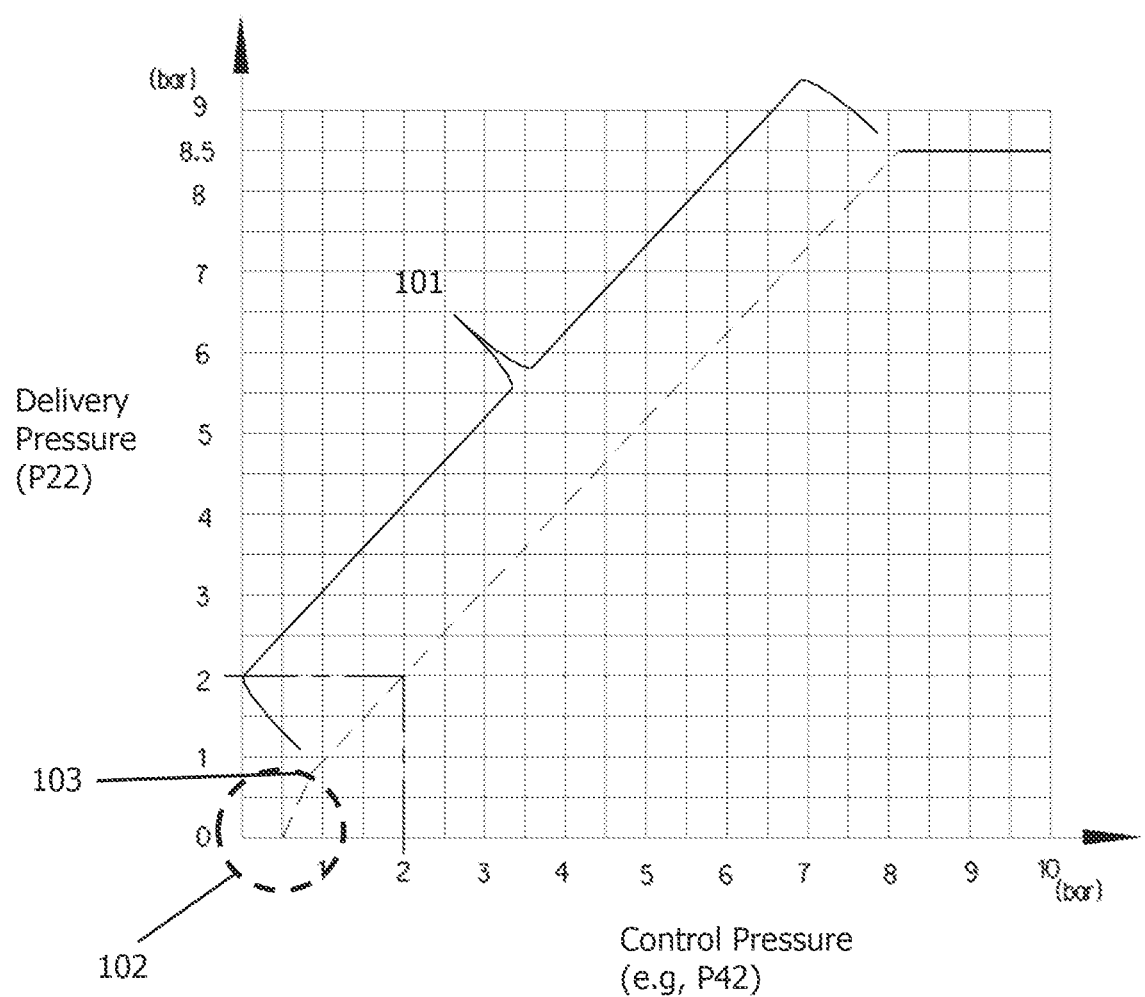
FIG. 1 shows an exemplary characteristic curve displaying a comparison of deliver pressure at port P22 of an exemplary trailer control valve and a control pressure received at primary control port P42 of the exemplary trailer control valve.

FIG. 1 shows an exemplary characteristic curve displaying a comparison of deliver pressure at port labeled "P22" of Y-Axis (the port is not shown in FIG. 1, but see e.g., FIG. 2 or FIGS. 3a and 3b for understanding) of an exemplary trailer control valve (not shown in FIG. 1, but see e.g., FIG.

Figure 2:
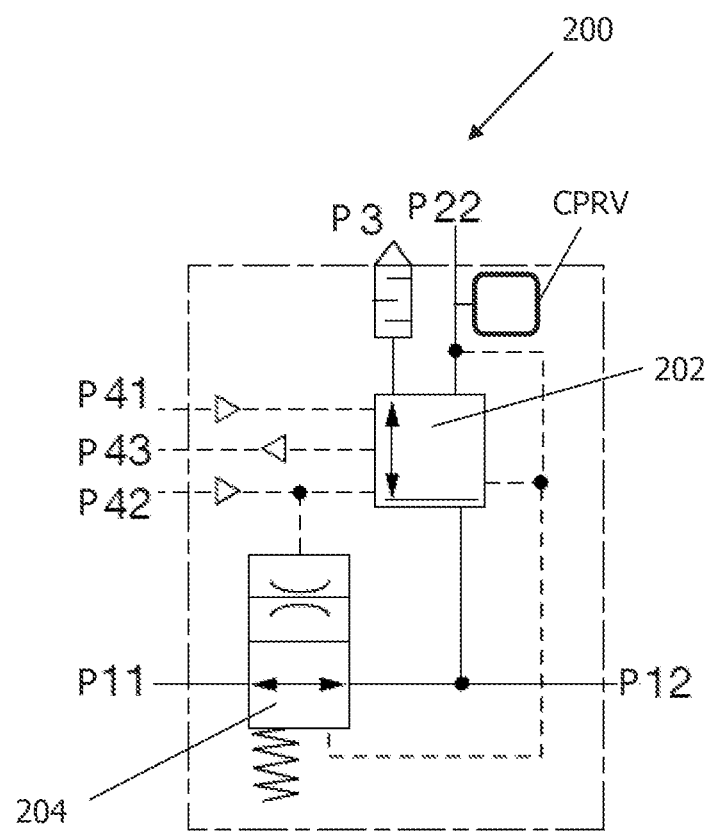
FIG. 2 shows a schematic diagram of a conventional trailer control valve.
Figure 3A:
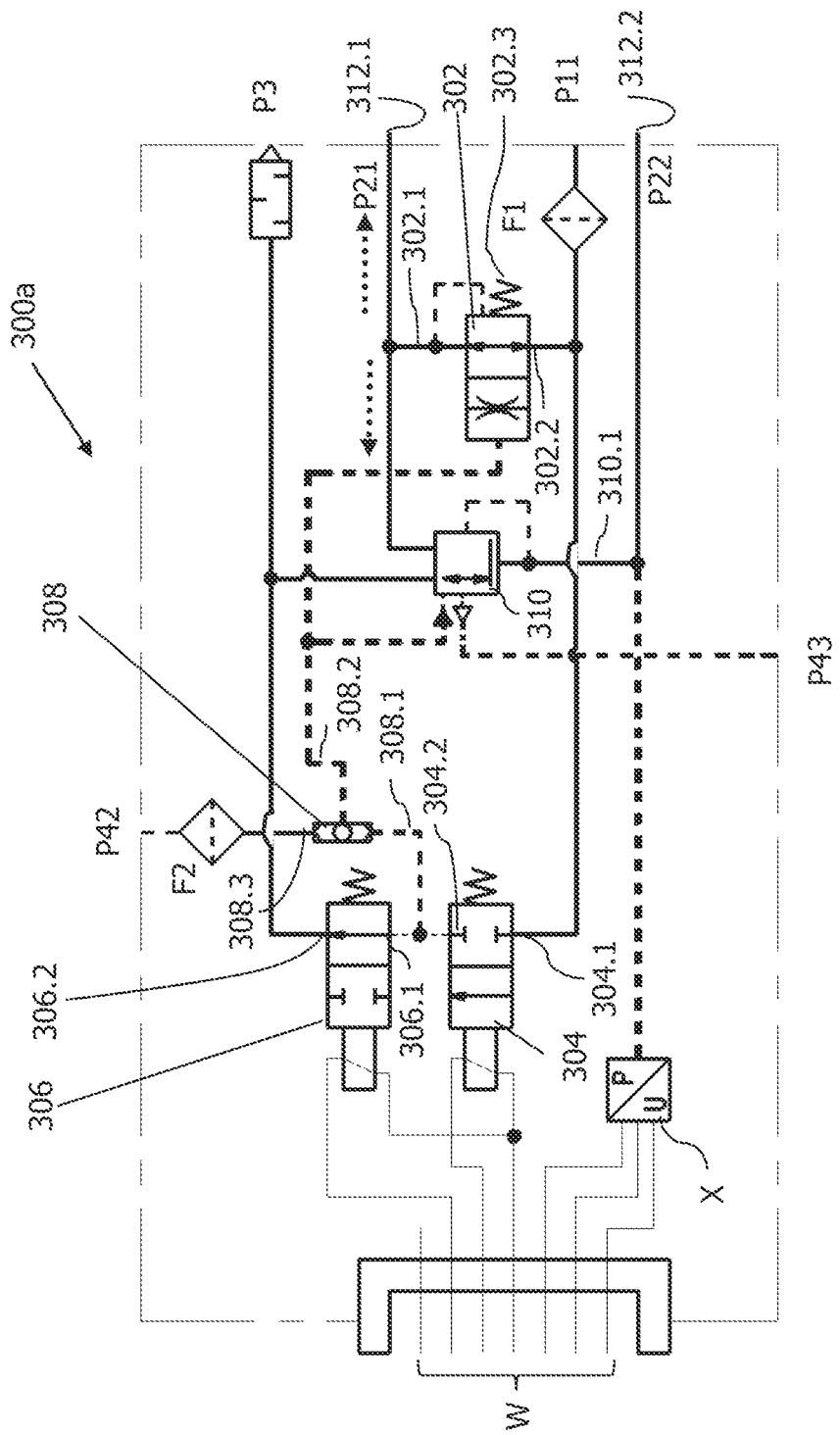
FIG. 3a shows a schematic diagram of a trailer control valve in accordance with an embodiment of the present disclosure.
Figure 3B:
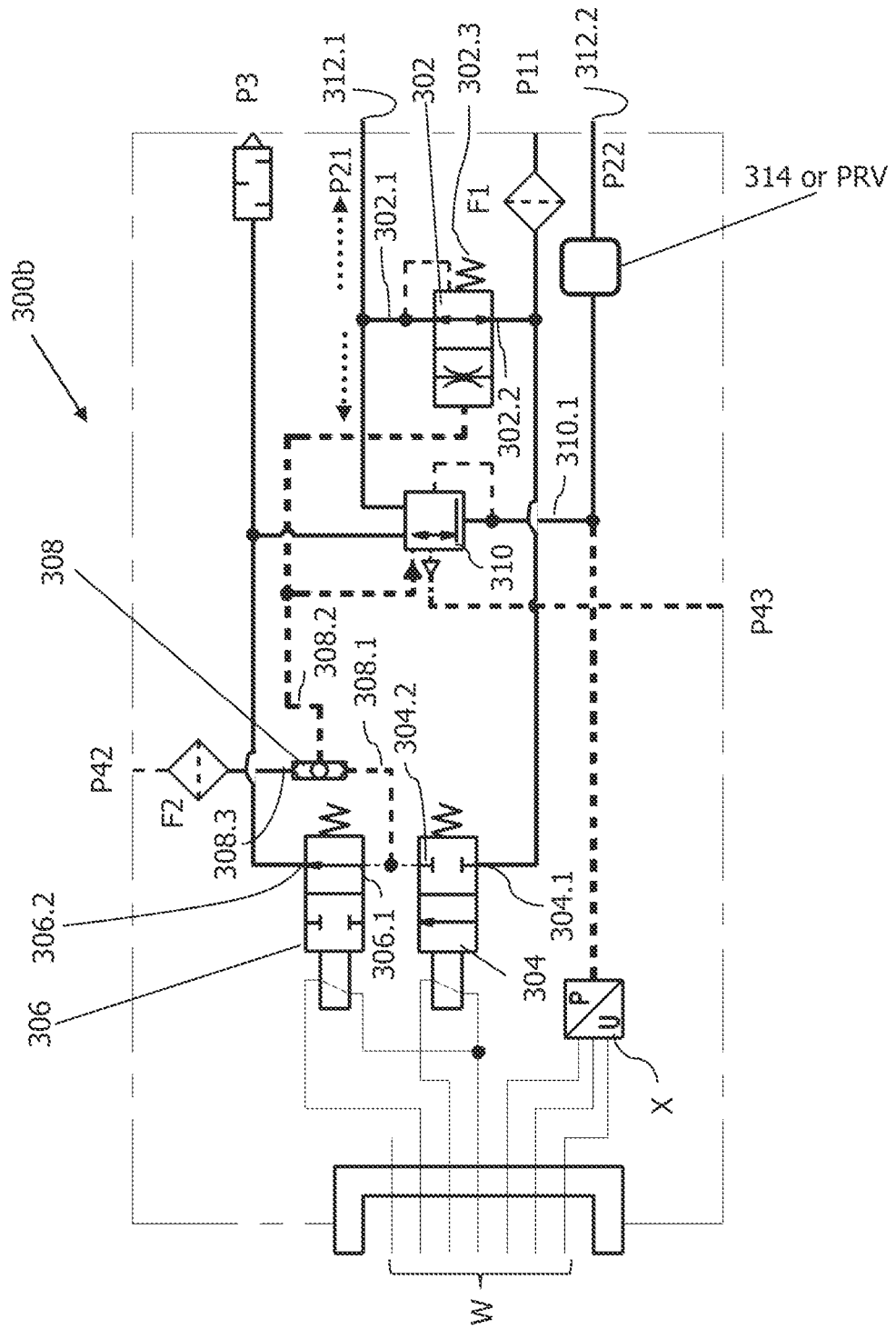
FIG. 3b shows a schematic diagram of a trailer control valve in accordance with another embodiment of the present disclosure.

2 or FIGS. 3a and 3b) and a control pressure received at primary control port P42 (the port is not shown in FIG. 1, but see e.g., FIG. 2 or FIGS. 3a and 3b) of the exemplary trailer control valve (not shown in FIG. 1, but see e.g., FIG. 2 or FIGS. 3a and 3b).

For the sake of explanation, it is denoted that the pressure at P22 leads to a coupling head (see e.g., 312.2 in FIG. 3a) provided at the end of P22. The coupling head is connected to the pneumatic line which represents the control pressure that is required to operate a trailer brake system. Alternative term for coupling heads is 'glad hand', which is predominantly used in brake terminologies.

The exemplary characteristic curve shown in FIG. 1 at a region 102 represents an increasingly disproportionate magnitude (or a slightly higher magnitude) of pressure recorded at port "P22" after approximately 0.5 bar (see X-axis of the curve) is achieved at port P42 (primary control port). As can be noticed, between e.g., 0.5 to 0.7 bar of pressure recorded at port P42, there is considerably surge in pressure at port P22.

This "surge" later changes or is relatively reduced at region "101" marked in graph shown in FIG. 1 after a point of deflection "103", which is also marked in the graph. In any case, the point of deflection 103 in FIG. 1 can represent opening of a predominance valve within a trailer brake control module i.e., based on the settings in the predominance valve, the curve at region 101 can move left or right in comparison to the curve at 103, but nevertheless would maintain a slope of 45 degrees. One such example of the predominance valve is cited in the background section is e.g., known from U.S. Pat. No. 4,264,108A. If the volume in the predominance valve is filled, the curve shown after region 102 i.e., in region 101 in FIG. 1 progresses almost proportionally. For instance, in simple terms, a 3 bar control input at e.g., port P42 can lead to a 2.7 or 3.6 bar output at port P22. This change in the output is referred to as a "predominance" setting, which can be adjusted to be in a predetermined range today from e.g., −1 bar to +0.3 bar. Typically, this type of change in predominance set is carried out after assembly of a trailer control valve or trailer brake module by a testing department before the product reaches a customer.

In any case, the predominance valve in simple terms extends the volume of a chamber of the trailer control valve connected to port P22 using e.g., a spring-based check valve system.

One of the reasons for providing this predominance valve in the pneumatic brake circuit is to enable achieving a balance in the braking rate between the towing vehicle and the towed vehicle.

The braking rate (z) of a vehicle is generally defined as:
z=braking rate of vehicle=J/g,
wherein 'J' refers to the deceleration of the corresponding vehicle (towed or towing) in 'm/s$^2$' and 'g' refers to the acceleration due to gravity=9.81 m/s$^2$.

However, an unmanaged difference in the braking rate between the towed vehicle and the towing vehicle can cause instability while braking the vehicle. In extreme cases, this may also result in effects such as jack-knifing.

For the sake of understanding, it is mentioned herewith that the desired braking rate of a vehicle and/or a trailer is dependent on a variety of factors such as size and its load carrying capacity, rolling resistance. Thus, a value or a range of values cannot be explicitly mentioned as these are customized based on the type of the vehicle, its characteristics, and also the characteristics of trailer attached to it. Furthermore, these values and/or ranges may be influenced by the class of the vehicles generally characterized by the weight, laden or unladen. In any case, what is required for an understanding, it is vital to have the difference in the braking rate between the towed and towing vehicle within a desired range. There are however variety of means to achieve this.

FIG. 2 shows a schematic diagram of a conventional trailer control valve 200.

Conventional trailer control valve 200 shown in FIG. 2 includes ports P3, P11, P12, P22 P41, P42, P43, a first control valve 204, a conventional relay valve 202 and a conventional predominance valve CPRV. A brief explanation of conventional trailer control valve 200 is provided herewith.

In FIG. 2, a supply pressure inlet P11 is shown which is typically connected to a pressurized fluid source (not shown in FIG. 2) such as a fluid reservoir. Supply pressure inlet P11 is connected to a trailer supply pressure outlet P12 which leads the output pressure to trailer brakes. Between supply pressure inlet P11 and trailer supply pressure outlet P12, a pneumatically controlled metering valve 204 is provided. Pneumatically controlled metering valve 204 operates for instance in two positions. In the first position as shown in FIG. 2 in the current state, pneumatically controlled metering valve 204 connects supply pressure inlet P11 directly to trailer supply pressure outlet P12 without any metering i.e., with no pressure reduction. However, in the second position, pneumatically controlled metering valve 204 may act as e.g., a throttled flow orifice wherein the supply pressure received at P11 is reduced before transmitting to trailer supply pressure outlet P12. For instance, metering valve 204 has two positions, one is fully open (full flow), and the second one is closed, smaller flow with an unspecified volume or flow rate.

Furthermore, conventional trailer valve 200 includes relay valve 202 which needs to be activated by control pressure to enable a connection between the pressure provided from supply inlet P11 to a trailer control pressure outlet P22. In order to activate and/or deactivate relay valve 202 control pressure can be derived from each of the following ports: primary brake signal port P41, a primary control port P42, and a parking brake control port P43. In non-activated position, relay valve 202 enables connection between P11 and pressure relief port P3. The relay valve 202, for instance, can be brought to the deactivated position when parking brake control port P43 is pressurized. At the deactivated state of relay valve 202, and when the parking brake is desired to be activated, one or more brake actuators at the wheel end of the vehicle are extended merely because of the force of one or more springs provided within the actuators. This is, however, part of a common general knowledge of the skilled person in the field of brake systems.

Finally, conventional predominance valve CPRV is provided in association with trailer control pressure outlet P22 to enable the predominance characteristics such as the as shown in region 101 of FIG. 1. This is merely shown for illustration of an additional volume connected to P22, but in practice the predominance valve may include a spring-based valve to let the pressure from port P22 into an extended volume it includes (see e.g., US patent publication 4264108 cited also above).

FIG. 3a shows a schematic diagram of a trailer control valve or a trailer brake control module 300a in accordance with an embodiment of the present disclosure.

In accordance with the present embodiment, trailer brake control module 300a is provided on a towing vehicle (not shown in FIG. 3a) in order to facilitate braking of a towed vehicle or trailer. The trailer brake control module 300a comprises a pressure supply port or a supply pressure inlet P11, a trailer control pressure port or outlet P22, a primary control port P42 for receiving either directly and/or indirectly a control brake pressure for operating the trailer brake control module 300a. In accordance with the present embodiment, the primary control port P42 receives the control brake pressure from a pneumatically operated pressure medium (not shown). In accordance with an exemplary embodiment, this pneumatically operated pressure medium can be a Brake Signal Transmitter (BST) or a Foot Brake Valve (FBV) or simply a valve that is directly connected to a brake pedal present at the driver's cabin. In principle, the pressure received at port P42 reflects largely the driver's actual brake demand.

In the same embodiment, trailer brake control module 300a includes a pneumatic control pressure line 308.1 providing alternative control brake pressure for operating trailer brake control module 300a, wherein the pneumatic control pressure line 308.1 receives the alternative control brake pressure from an electronically operated pressure medium. Furthermore, a relay valve 310 (which is part of trailer brake control module 300a) is activated using either the control brake pressure received at primary control port P42, or the alternative control brake pressure from pneumatic control pressure line 308.1, wherein on activating relay valve 310, the pneumatic pressure, or at least part of that received at pressure supply port P11, is connected to trailer control pressure port P22. In the same embodiment, the trailer brake control module 300a; 300b is additionally provided with braking rate 'z' rebalancing unit so that the difference of the braking rate between said towing vehicle and said trailer is maintained within a permissible threshold range, wherein in accordance with the present embodiment said brake rate rebalancing unit is enabled using an electronically operated sub-unit (W, 304, 306), and more particularly, said brake rate rebalancing unit is provided within a housing (406) of the trailer brake module (300b).

For instance, brake control module 300a in this embodiment includes said electronically operated sub-unit. Said sub-unit may include a connection plug W shown in FIG. 3a, a first solenoid valve 304, a second solenoid valve 306, and a pressure sensor 'X' (e.g., PWM based pressure sensor). In the same instance, at least connection plug W may be connected to a centralized electronic brake module (not shown in FIG. 3a) or an electronic control unit, which provides the requisite commands to operate or activate or deactivate e.g., first and second solenoid valves 304, 306 so as to enable maintenance of the braking rate difference between said towing vehicle and said trailer within the permissible threshold range. For instance, in a setup where electronic control is used in all normal operating conditions such as EBS, the predominance is electronically realized. One of the means of realizing this electronically is by the so-called CFC (coupling force control) function.

It may be understandable here that said electronic control unit or the centralized electronic brake module may receive variety of inputs from sensors within the towing vehicle and the towed vehicle or trailer to determine what is the optimum braking performance that is required at any given time. In particular, the optimum braking performance is arrived at, such that the centralized electronic brake module or the electronic control unit within the trailer brake control module 300a can operate first and second solenoid vales 304 and 306 and effectively control e.g., operating frequency or cycles of said valves 304 and 306. By this way the maintenance of e.g., the braking rate difference between said towing vehicle and said trailer within the permissible threshold range is possible to be performed dynamically. It should be here understood that the term "dynamically" may refer to the varying values at different driving conditions experienced by the towed and towing vehicles. In accordance with this embodiment, should however the electronically operated sub-unit not function for any technical or electronic failure, there is no possibility of achieving the predominance.

Thus, in accordance with this embodiment explained above, the braking rate (z) rebalancing unit is the same as said electronically operated sub-unit. The electronically operated sub-unit is part of trailer brake control module 300a.

In accordance with the same or different embodiment discussed in association with FIG. 3a, it is also noticeable that there is no further pneumatic brake "control" port other than a primary control port P42 and a parking brake control port P43 within trailer brake control module 300a for receiving either directly and/or indirectly a control brake pressure for operating trailer brake control module 300a. Details of the pressurized air flow direction can be deciphered from the arrow marks indicated in FIG. 3a exiting and entering relay valve 310. Furthermore, the parking brake or hand brake signal that is provided to engage the parking brake of the trailer or the towed vehicle is supplied through port P43.

One of the technical advantages envisaged in trailer brake control module 300a vis-à-vis conventional trailer control valve or module 200 shown in FIG. 2. In particular, the need for port P41 in module 300 is eliminated in comparison to trailer control valve or module 200 taking the overall construction of trailer brake control module 300a into account. Thus, the feature "the trailer brake control module 300a consists of the following ports: the primary control port (P42), a parking brake control port (P43), the pressure supply port (P11), the trailer control pressure port (P22), a trailer supply pressure port (P21), and a pressure relief port (P3) within a housing (406) of the trailer brake module)" is directed to denote absence of any additional control port. A skilled person would notice that, this implies that a redundant pneumatic brake control port that can transmit the control brake pressure reflecting the driver's brake demand is made unnecessary. It also further implies a control piston and a control chamber within a trailer control valve is spared due to the absence of an additional port P41 which would activate relay valve 202 or 310. This particular technical advantage is applicable to all the trailer control brake modules explained in accordance with the present disclosure.

Furthermore, as can be seen in FIG. 3a, trailer brake control module 300a is additionally provided with a double check or select-high valve 308 for supplying one of the control brake pressure and the alterative control brake pressure depending on the magnitude of each of the brake pressures, wherein the brake pressure which has the higher magnitude is supplied to relay valve 310. As mentioned above, double check valve 308 receives the control brake pressure from port P42 as marked in FIG. 3a. Optionally, a second filter F2 is provided at the line connecting primary control port P42 and double check valve 308. Furthermore, double check valve 308 receives the alternative control brake pressure via solenoid valve 304 (depending on its respective position) and a first connection 308.1 to connect at least part of the pressure received from port P11.

In accordance with the present embodiment, double check valve 308 is configured to function as the select-high valve i.e., it moves a spool within the body of double check valve 308 to the side of the port which has a lesser pressure magnitude thereby connecting the pressure port with higher pressure magnitude to the outlet. From FIG. 3a, a skilled person would derive that if pressure from first connection 308.1 is of higher magnitude compared to the magnitude of pressure received from primary control port P42, the connection between first connection 308.1 and output port 308.2 is established. The situation is opposite if pressure is of higher magnitude is at port P42. This allows for saving costs in overall construction of trailer brake control module 300a as it potentially replaces an electronically controlled solenoid valve in its place along with detecting pressure sensors at each of the connections from port P42 and connection 308.1 and, thus, saves cost for a manufacturer of trailer brake modules. For a tier I manufacturer as the applicant/patentee, this results in reduction of costs depending on the scale and at the same time potentially saves time during the assembly.

In the present embodiment, trailer brake control module 300a further comprises a trailer supply pressure port P21, wherein pressure supply port P11 and trailer supply pressure port P21 are connected via a pneumatically controlled metering valve 302. The technical purpose of using metering valve 302 in accordance with the present embodiment is for instance to ensure at least a minimum pressure supply to trailer brakes via port P21. As can be seen in FIG. 3a, inlet port 302.2 of metering valve 302 is connected to pressure supply port P11 and in both the positions of metering valve 302 some amount of pressurized fluid is transmitted to trailer supply pressure port P21 via outlet port 302.1. The position of metering valve 302 is controlled by using pressure at least partly from output port 308.2.

In other words, pneumatically controlled metering valve 302 operates in two positions, namely first and second positions, wherein in the first position, metering valve 302 connects pressure supply port P11 and the trailer supply pressure port P21 through a throttled flow orifice, and wherein in the second position, metering valve 302 connects pressure supply port P11 and trailer supply pressure port P21 in an invariable and open manner such that the whole of the pneumatic pressure received at pressure supply port P11 is transmitted to trailer supply pressure port P21. In the embodiment disclosed in FIG. 3a, metering valve 302 includes a spring 302.3 which holds a piston or a spool in a predetermined position and the pressure from output port 308.2 determines the position of metering valve 302. Further, pneumatically controlled metering valve 302 is held in the second position with the help of at least partly because of the pre-existing pressure in trailer supply pressure port P21 and spring 302.3.

On a different note, but part of the embodiment, trailer brake control module 300a includes first electronically controlled solenoid valve 304 whose inlet 304.1 is connected to pressure supply port P11 and outlet 304.2 is connected selectively to relay valve 310, wherein outlet 304.2 supplies the alternative control brake pressure. This has a direct effect on the quantity and/or rate of the pressurized fluid that can be supplied to double check valve 308. Furthermore, in accordance with an embodiment, the connection line which connects port P11 and inlet 304.1 includes a first filter F1 as can be derived from FIG. 3a in order to remove any moisture and/or impurities in the pressurized fluid. Overall functioning of trailer brake control module 300a is provided herewith.

As shown in FIG. 3a, with reference 'W', it denotes that electronic signals can be received via electric connection ports at "W". These electronic signals operate first and second solenoid valves 304 and 306. Similar to first electronically controlled solenoid valve 304, second electronically controlled solenoid valve 306 includes an inlet 306.1 and an outlet 306.2, wherein based on the position of second electronically controlled solenoid valve 306 a connection from outlet 306.2 to pressure relief port P3 is either established or prevented. They can be activated at varying frequency cycles such that a precise control over the pressure supplied to pneumatic control pressure line 308.1. It should be noted that the activation of said first and second solenoid valves 304 and 306 can either be driver initiated or automatically performed by the electronic control unit (not shown in FIG. 3a) based on the braking requirements of the trailer including the dynamically changing braking rates and emergency braking conditions at any given time. For instance, the emergency braking conditions take into account of external and/or environmental factors such as surface and/or road conditions.

Thus, based on the activation states of solenoid valves 304 and 306, the supply pressure that is received at port P11 is sent to pneumatic control pressure line 308.1. This brake pressure is referred in the present application as "alternative" control brake pressure. Simultaneously, a control brake pressure is also received at primary control port P42 via a second pneumatic control pressure line 308.3. Both the control brake pressure and said alternative control brake pressure converge at double check valve 308, wherein whichever pressure line among 308.1 and 308.3 carries pressure with higher magnitude is fused with output port 308.2. The pressure from output port 308.2 is partly sent to relay valve 310 and partly sent to metering valve 302. When the pressure at output port 308.2 is above a certain threshold, a spring-based resistance (not shown) within relay valve 310 is overcome. This results in establishing a fluid connection between ports P11, P21 and P22 so that all said ports are supplied with pressure from a pressurized fluid source such as a reservoir (not shown in FIG. 3a). This reservoir is connected to port P11.

The pressure exiting port P21 is connected to a first coupling head 312.1, which in turn is connected to a supply pressure line for trailer brakes. Typically coupling head 312.1 is red colored. On the other hand, the pressure exiting port P22 is connected to a second coupling head 312.2, which in turn leads to a control pressure line for controlling or operating the trailer brakes.

Furthermore, in accordance with a particularly preferred embodiment of the present disclosure, pressure at line connected to port P22 is measured almost constantly using sensor 'X' referenced in FIG. 3a. This sensor 'X' of this particularly preferred embodiment is a PWM-based-pressure sensor or Pulse-Width-Modulation-based-pressure sensor. The usage of PWM-based-pressure sensor enables "functional safety" according to ISO standard 26262 of trailer control module 300a. Over the duration of usage of trailer control module 300a in a commercial vehicle, the usage of PWM based pressure sensor directly affects the average life cycle of batteries used in the commercial vehicle.

FIG. 3b shows a schematic diagram of trailer control valve or trailer control module 300b in accordance with another embodiment of the present disclosure.

The elements that are explained in reference to FIG. 3a are same in relation to FIG. 3b except that trailer control module 300b additionally includes a mechanically operated sub-unit '314' to establish the predominance or to maintain the brake rate difference between the towing vehicle and the trailer within a predetermined threshold in addition to or alternative to the electronically operated sub-unit (W, 304, 306). The elements that are same in FIG. 3b and FIG. 3a are marked with same reference signs. For the sake of simplicity, the explanation provided in relation to the elements with the same reference signs in FIG. 3b is not repeated.

It is nevertheless noted that the disclosure provided in FIG. 3a is provided to illustrate that in accordance with an exemplary embodiment on how the braking rate (z) rebalancing unit operates, particularly when it is implemented or enabled using the electronically operated sub-unit (W, 304, 306). As mentioned in the same embodiment, the electronically operated sub-unit e.g., 'W' may receive controls from a central electronic unit (such as 508 in FIG. 5) or trailer control module 300a or 300b may have an electronic control unit be mounted to a housing of said module.

In any case, the present embodiment discloses the brake rate rebalancing unit is enabled either optionally or additionally using a mechanically operated sub-unit 314 (which can alternatively be referred to as predominance valve) that is coaxially positioned in relation to the relay valve 310. As symbolically represented in FIG. 3b, mechanically operated sub-unit 314 is present in the path that connects outlet 310.1 of relay valve 310 and trailer control pressure port P22. This has space-saving effect taking the overall construction of trailer brake control module 300b into account. Further details on this are provided in the explanation in relation to FIG. 4b.

It is however noted that mechanically operated sub-unit '314' that is symbolically shown in FIG. 3b to be in the path of port P22 as merely to represent an additional volume along the path. This additional volume may be selectively opened and/or closed using the pressure that reaches port P22, the details of which will be explained in reference to FIG. 4b. In accordance with one exemplary application, this selective opening of mechanically operated sub-unit 314 causes the variation in pressure characteristics between port P42 and P22, as displayed in FIG. 1 of the present application with reference sign "102". The initial spike in pressure at port P22 is due to the closed status or non-opening of the predominance or additional volume of the mechanically operated sub-unit '314'. Once the predominance or additional volume is opened for access to pressure at port P22, there is a slight reduction in the pressure magnitude (or a change in the slope of the curve) at port P22 which is shown in the graph of FIG. 1 beyond region 102.

As can be understood, this equalization of pressure magnitude at e.g., port P22 needs to be taken into account every time trailer brake control module 300b is operated and/or activated, wherein the predominance volume is selectively opened.

Figure 5:
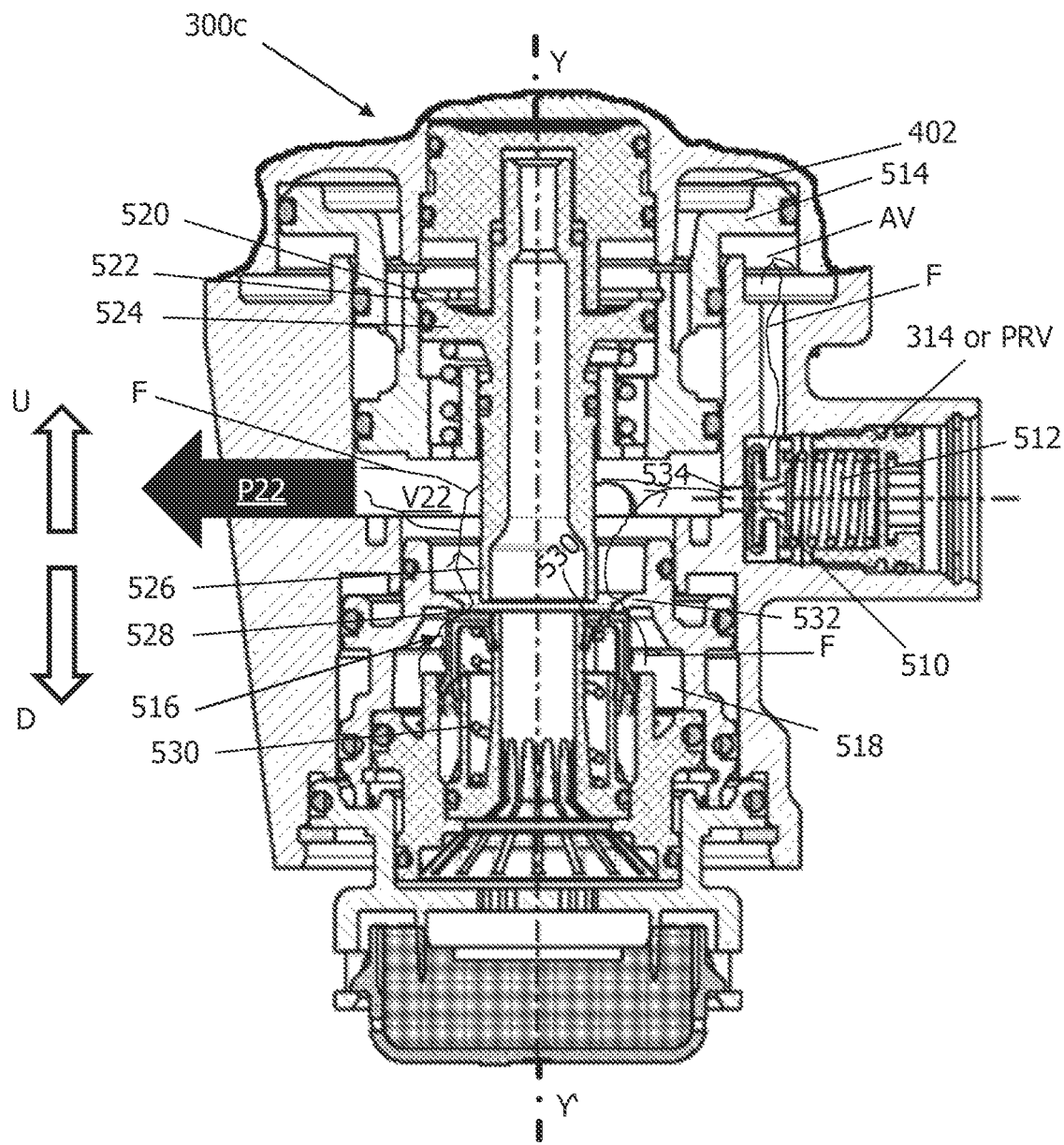
FIG. 5 shows a cross-sectional view of a trailer control valve in accordance with yet another embodiment of the present disclosure.

To the contrary, in trailer brake control module 300a disclosed in relation to FIG. 3a, this phenomenon of providing pressure normalization after initial inequality of pressures at ports P22 and P42 as disclosed in region 102 of FIG. 1 is established via electronic control algorithms or control methods which are implemented via an electronic control unit 508 of FIG. 5.

One of the unique advantages of trailer brake control module 300b is that it combines the possibility of purely electronically controlling pressure characteristics at ports P22 and P42 to follow the trend of pressure magnitudes at the respective ports as displayed in e.g., FIG. 1 with an additional or optional mechanically operated sub-unit '314' within trailer brake control module 300b. As can be noted, in case of failure in electrical or electronic connection systems, which can happen in the electric connection ports at CW of trailer control module 300a or 300b, a mechanically operated sub-unit to selectively open predominance volume or to bring the pressure characteristics at ports P22 and P42 within desired range can still be achieved pneumatically. Furthermore, this mechanically operated sub-unit 314, and its threshold pressure to selectively open an additional volume (AV) or a predominance volume for pressure normalization at ports P22 and P42, can be calibrated to the overall brake system requirement before delivery to vehicle manufacturers.

If necessary, the entire mechanically operated sub-unit 314 within trailer brake control module 300b can be disabled for purely electronic controlling to achieve the necessary pressure characteristics at ports P22 and P42, and vice-versa.

Figure 4A:
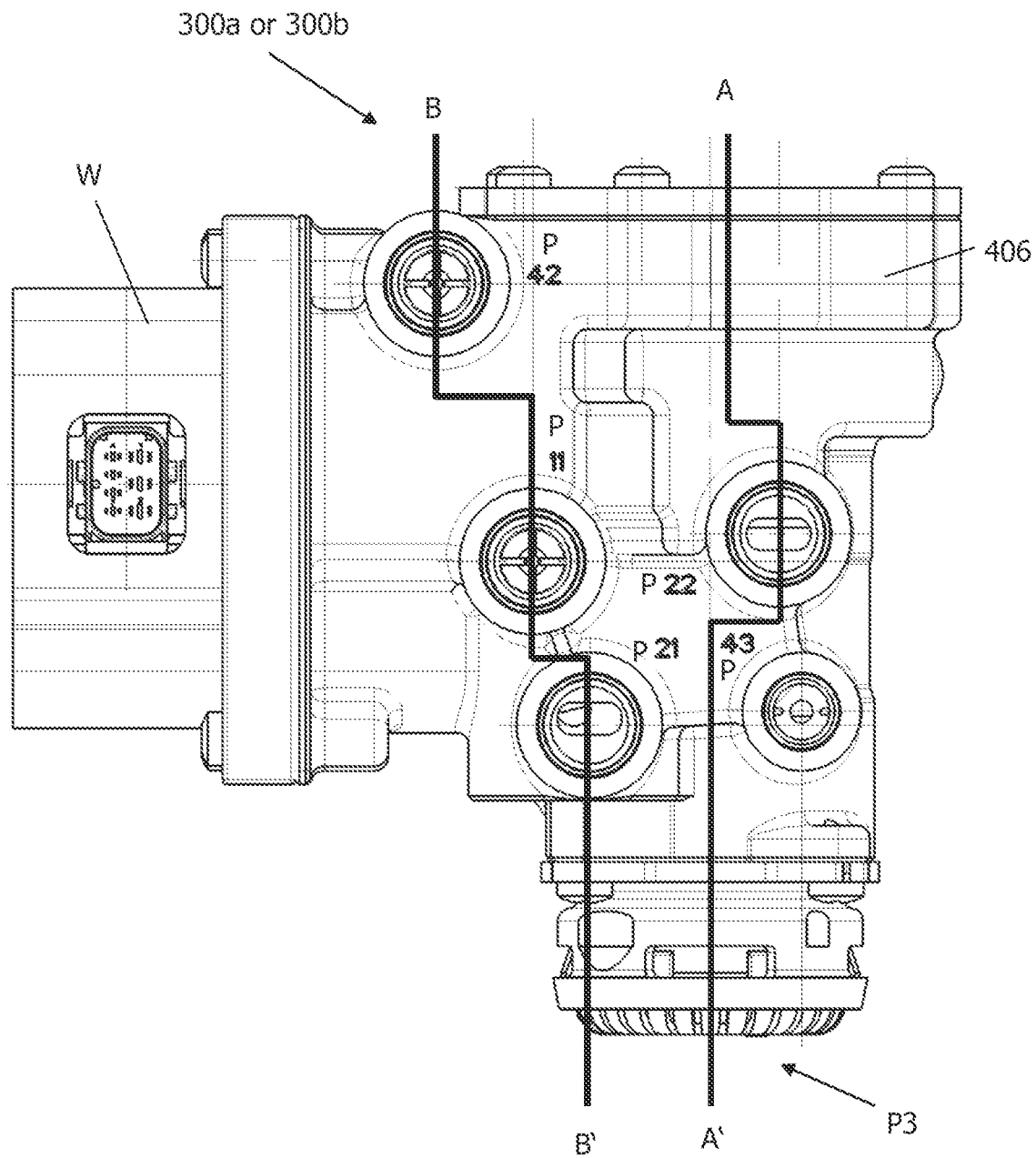
FIG. 4a shows an external view of a trailer control valve in accordance with an embodiment of the present disclosure.

FIG. 4a shows an external view of a trailer control valve or trailer brake control module 300a or 300b in accordance with an embodiment of the present disclosure. As shown in FIG. 4a, trailer brake control module 300a or 300b consists of the following ports: the primary control port (P42), a parking brake control port (P43), the pressure supply port (P11), the trailer control pressure port (P22), a trailer supply pressure port (P21), and a pressure relief port (P3) at housing 406 of trailer brake module 300a or 300b.

The external view illustrates the spatial arrangement of ports P11, P21, P22, P42, P43, and P3 in accordance with an exemplary embodiment. 'W' in FIG. 4a shows the electronic connection point where wirings and other related components are enclosed. Furthermore, solenoid valves 304 and 306 of FIGS. 3a and 3b are connected to the wirings provided within the section labeled as "W" in trailer brake control module 300a or 300b as shown in FIG. 4a.

Figure 4B:
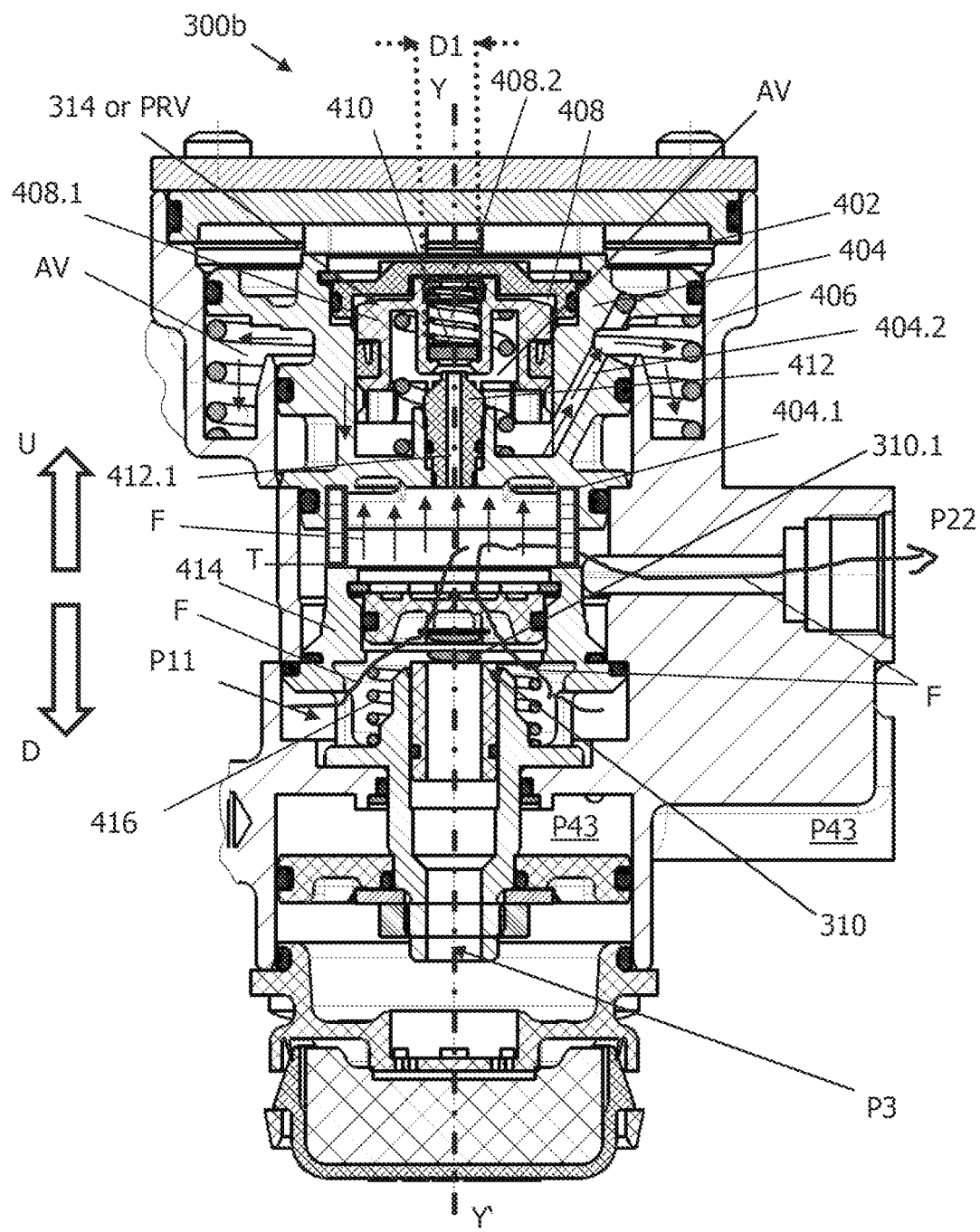
FIG. 4b shows a cross-sectional view (taken at section B-B) of a trailer control valve (shown in FIG. 4a) in accordance with an embodiment of the present disclosure.
Figure 4C:
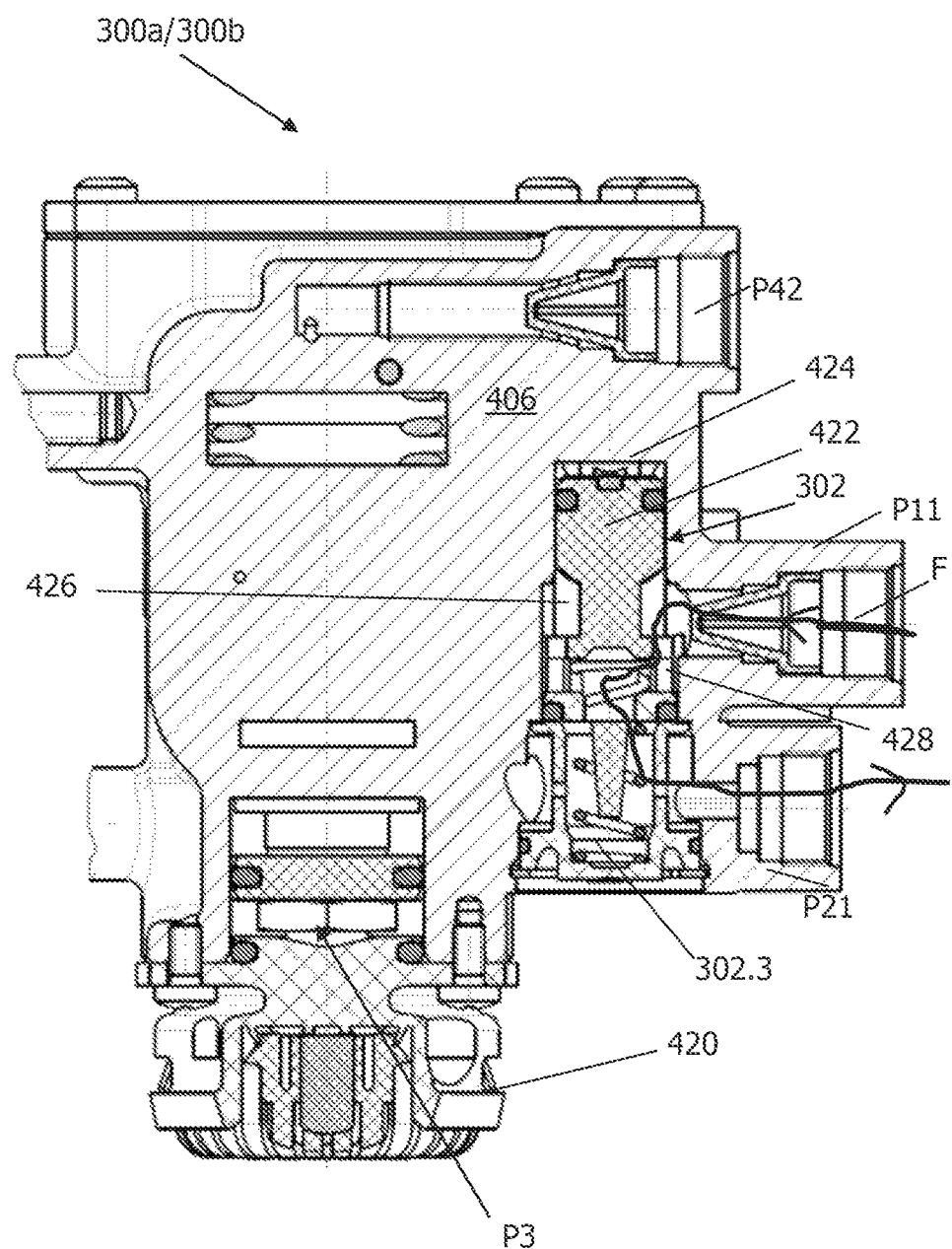
FIG. 4c shows a cross-sectional view (taken at section A-A) of a trailer control valve (shown in FIG. 4a) in accordance with an embodiment of the present disclosure.

Furthermore, the cross-sectional view displayed in FIG. 4b is from the plane A-A' whereas the cross-sectional view in FIG. 4c is from the plane B-B'.

FIG. 4b shows a cross-sectional view of a trailer control valve 300b in accordance with an embodiment of the present disclosure.

In accordance with the present embodiment or in conjunction with the embodiment associated with FIG. 3b, trailer brake control module 300b further comprises a first pneumatic control chamber 402, to which primary control port P42 or pneumatic control pressure line 308.1 is connected. As the pressurized air enters from port P42 or from pneumatic control pressure line 308.1 into chamber 402, a first piston 404 moves linearly down along axis Y-Y' as shown in FIG. 4b. The downward direction in relation to axis Y-Y' is shown as CD' in FIG. 4b.

After the downward movement of piston 404 due to pressurization of pneumatic control chamber 402 to in FIG. 4b, an extension 404.1 impinges on a top surface of a relay piston 414. Relay piston 414 is configured to move in a fluid tight manner along axis Y-Y' within a housing 406 and is supported by relay spring 416. As relay piston 414 moves downwards, valve seat 310.1 of relay valve 310 is dislodged, thereby enabling a pressure connection between chamber marked as P11 and port P22. The direction of flow of air in case activating relay valve 310 is shown via arrow marks 'F' in FIG. 4b.

With regards to a predominance volume or additional volume (denoted as "AV" in FIG. 4b) within trailer brake control module 300b, as can be seen, it is provided coaxially with respect to relay valve 310 along axis Y-Y', but at the same time vertically above relay valve 310. Said predominance volume or additional volume AV is part of mechanically operated sub-unit 314 or predominance valve (PRV). For the sake of illustration, the functioning of mechanically operated sub-unit (314) is explained herewith.

On activating relay valve 310 by relay piston 414, the pressurized air enters chamber associated with P22 from P11 via the direction of flow shown as 'F'. The pressurized air enters predominance volume chamber 408. The connection between P22 and chamber 408 is not shown in the cross-section displayed in the present figure. In any case, as the pressurized air enters chamber 408 of the mechanically operated sub-unit 314 (or the predominance valve PRV), or at least a part of mechanically operated sub-unit 314, a predominance valve piston 408.1 moves in downward direction along axis Y-Y'. After certain amount downward movement of piston 408.1, a plate valve 410 positioned concentrically with piston 408.1 hits an adjustment screw 412. On still further downward movement, adjustment screw 412 displaces or lifts plate valve 410 against a spring 408.2 located within chamber 408. It is noted that plate valve 410 is not exactly circular in shape. The shape of plate valve 410 is only good enough to close a central bore 412.1 of adjustment screw 412. However, plate valve 410 is not in interference fit or flush with an inner diameter "D1" of piston 408.1 and there exists a gap between a lateral outer surface and inner diameter D1 of piston 408.1. Thus, on dislodging or lifting plate valve 410 by adjustment screw 412 on piston 408.1's downward movement, the pressurized air from chamber 408 enters the additional volume or predominance volume AV. This volume is responsible for commensurate pressure reduction at port P22 and causes the change in pressure characteristics as shown in region 102 of FIG. 1. As already explained above, the change in the pressure characteristics between ports P42 and P22 causes proportional change in the braking rate of the trailer or the towed vehicle for which the brake needs to be applied using trailer brake control module 300b. By this way, mechanically operated sub-unit (314) maintains the difference of the braking rate between the towing vehicle and the trailer within a permissible threshold range.

It follows from the above, in accordance with an embodiment of the present disclosure, mechanically operated sub-unit 314 is operated such that an initial pressure increase at trailer control pressure port P22 (shown at region 102 of FIG. 1) is accommodated by providing an additional volume AV within the trailer brake control module 300b. Moreover, it is reiterated that additional volume AV of predominance valve PRV is coaxially arranged, but vertically above relay valve 310 within trailer brake control module 300b. The wording "vertically above" can be understood in the present context with the help of disclosure in FIG. 4b along with arrow mark "U" denoting upward direction or what it means to be above in relation to relay valve 310. One exemplary technical advantage here is that, trailer brake control module 300b provides predominance valve PRV in addition to or alternative to the electronically controlled sub-unit of trailer brake control module 300a to enable maintaining the braking rate difference between the trailer and the towing vehicle. Thus, predominance valve PRV of trailer brake control module 300b is configured to operate independently from the electronically controlled sub-unit of trailer brake control module 300a while at the same time not disabling or disturbing the capability of the electronically controlled sub-unit to perform e.g., coupling force control (CFC) i.e., to keep the braking rate difference between the trailer and the towing vehicle within a threshold range.

Furthermore, in trailer brake control module 300b of the present embodiment, first control piston 404 separates first pneumatic control chamber 402 and additional volume (AV i.e., part of predominance valve PRV), and moreover first control piston 404 integrally comprises a fluid flow path 404.2 indirectly connecting trailer control pressure port P22 and additional volume (AV) through the above-explained mechanism.

FIG. 4c shows a cross-sectional view of trailer control valve or trailer brake control module 300a or 300b in accordance with an embodiment of the present disclosure.

The cross-sectional view of trailer brake control module 300a or 300b displays the section of module as cut at plane B-B' of FIG. 4a.

The primary purpose of FIG. 4c is to show the spatial arrangement of ports P42, P11 and P21 along with the flow path 'F' of the pressurized fluid from port p11 towards P21. Furthermore, the structure and working of metering valve 302 as shown and explained also in conjunction with FIGS. 3a and 3b is explained with the assistance of cross-sectional view of valve 302.

As also shown in FIGS. 3a and 3b, valve 302 lies in the direct fluid path between ports P11 and P21. Valve 302 includes a linear piston 422 that can linearly reciprocate within a cylindrical chamber 426. Piston 422 is held a predetermined position using spring 302.3. Piston 422 is configured to operate in two positions as also explained before i.e., first and second positions. In the first position, metering valve 302 connects pressure supply port P11 and trailer supply pressure port P21 through a throttled flow orifice 428, and wherein in the second position, metering valve 302 connects pressure supply port P11 and trailer supply pressure port P21 in an invariable and open manner such that the whole of the pneumatic pressure received through pressure supply port P11 is transmitted to trailer supply pressure port P21. In FIG. 4c, the displayed position is in the second position as shown in FIGS. 3a and 3b as well. The pressurized fluid or air from P11 is directly sent without any metering to P21.

However, when a control pressure via output port 308.2 (not shown in FIG. 4c, but refer to FIGS. 3a and 3b) enters a metering chamber 424 present above piston 422, the downward movement of piston 422 brings the first position of valve 302 and causes narrowing down of orifice 428. Hence, a reduced amount of pressurized air is sent to port P21 from port P11 in the first position as compared to the second position of valve 302.

Furthermore, a silencer 420 is provided at bottom portion of housing 406 that is configured to reduce the noise generated during the operation of trailer brake control module 300a or 300b. Silencer 420 is positioned at pressure relief port P3 of trailer brake control module 300a or 300b.

FIG. 5 shows a cross-sectional view of a trailer brake control module 300c in accordance with another embodiment of the present disclosure.

In particular, FIG. 5 shows an arrangement of predominance valve PRV or mechanically operated sub-unit 314, which is positioned perpendicular to axis Y-Y' of trailer brake control module 300c. Furthermore, it is also realizable that predominance valve PRV is located vertically above a relay valve 516 of trailer brake module 300c. In order to show what is meant by "vertically above"—an arrow mark with reference "U" is shown in FIG. 5. The general function of trailer brake control module 300b is explained herewith. First pneumatic control chamber 402 receives control pressure from port P42 (not shown in FIG. 5, but can be found in schematic representation of FIG. 3a). This control pressure in first pneumatic control chamber 402 pushes a first relay piston 514 in downwards direction "D". First relay piston 514 as shown in FIG. 5, includes a stopper 520 inserted in a groove 522. Due to this downward movement of first relay piston 514, a second relay piston 524, which is functionally coupled to first relay piston 514 via stopper 520 also moves in the downward direction "D".

Furthermore, second relay piston 524 includes an axial extension 526 which impinges on a top surface 526 of a valve seat 530 to move said valve seat 530 in downwards direction against a resisting force of a spring 530 within relay valve 516, thereby removing a closed contact at a contact zone 528 between valve seat 530 and a lateral extension 532 of a supply pressure receiving chamber 518. Due to this downward movement of valve seat 530, supply pressure receiving chamber 518, connected to port P11 (not shown in FIG. 5, but refer to the schematic illustration in FIG. 3a or 3b), now establishes a fluid connection with a control port pressure chamber V22. As shown in FIG. 5, control port pressure chamber V22 is connected to port P22 on one side shown purely for illustrative reasons and is connected to predominance valve PRV on the other side.

The pressurized air received at chamber V22 reaches an inlet 534 of predominance valve PRV, which is normally closed by a valve cap 510. If the pressure of the air reaching inlet 534 is higher than a threshold pressure that can overcome the resisting force of a spring 512 of predominance valve PRV, valve cap 510 is lifted and a fluid connection is established between chamber V22 and additional volume "AV" as shown in FIG. 5 with arrow mark "F"— a symbolic representation of fluid flow direction. In particular "F" in FIG. 5 shows how the pressurized air starting from supply pressure receiving chamber 518 to V22 to inlet 534 to additional volume AV while at the same time reaching trailer control pressure port P22.

Apart from the other details, valve 300c includes all the elements displayed in valve 300a in FIG. 3a and complies with the schematic layout displayed in FIG. 3b.

Figure 6:
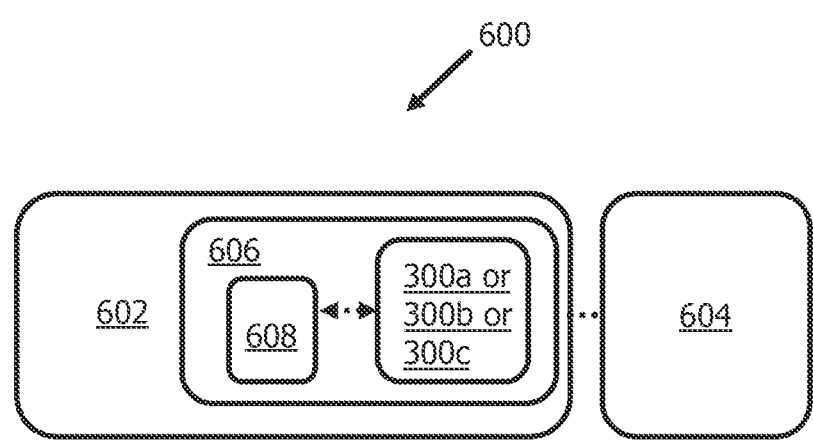
FIG. 6 schematically shows a commercial vehicle, or an autonomous vehicle equipped with a trailer control valve in accordance with an embodiment of the present disclosure.

FIG. 6 schematically shows a commercial vehicle 600, or an autonomous vehicle 600 equipped with a trailer control valve or trailer brake control module 300a or 300b or 300c in accordance with an embodiment of the present disclosure.

More particularly, vehicle 600 includes a pneumatic brake system 606, which in turn comprises trailer brake control module 300a or 300b or 300c of any one of the above-mentioned embodiments, and an electronic control unit 608 connected to trailer brake control module 300a or 300b or 300c to perform brake functions with or without driver brake demand.

In accordance with an embodiment, the electronic control unit 608 controls the electronically operated sub-unit (W, 304, 306) of trailer brake control module 300a such that braking rate (z) rebalancing unit achieves the maintenance of the difference of the braking rate between towing vehicle 602 and towed vehicle 604 within said permissible threshold range. This is achieved by obtaining the requisite pressure characteristics as illustrated above at ports P22 and P42 e.g., by electronically implemented operating technique through first and second solenoid valves 304 and 306.

LIST OF REFERENCE SIGNS (PART OF THE DESCRIPTION)

101—a second region representing a proportional progression of the magnitude of pressure at port P22 in relation to port P42
102—a region or an area representing a minor delay in the beginning of recording any pressure at port "P22" when the pressure recorded at primary control port "P42" is already at approximately 0.5 bar
200—conventional trailer control valve
202—relay valve of conventional trailer control valve 200
204—pneumatically controlled metering valve
PRV—a predominance valve,
CPRV—conventional predominance valve
P3—pressure relief port
P11—supply pressure inlet
P12—trailer supply pressure outlet
P22—trailer control pressure outlet
P41—primary brake signal port
P42—primary control port
P43—parking brake control port
300a—trailer brake control module of one embodiment
300b—trailer brake control module of another embodiment
300c—trailer brake control module of a yet another embodiment
302—pneumatically controlled metering valve
302.1—outlet port of pneumatically controlled metering valve 302
302.2—inlet port of pneumatically controlled metering valve 302
302.3—spring of pneumatically controlled metering valve 302
304—first electronically controlled solenoid valve
304.1—inlet of first electronically controlled solenoid valve
304.2—outlet of first electronically controlled solenoid valve
306—second electronically controlled solenoid valve
306.1—inlet of second electronically controlled solenoid valve
306.2—outlet of second electronically controlled solenoid valve
F1—first filter
F2—second filter
308—double check valve
308.1—first connection of double check valve 308
308.2—output port of double check valve 308
308.3—second pneumatic control pressure line
310—relay valve
310.1—outlet of relay valve 310
312.1—first coupling head
312.2—second coupling head
314—mechanically operated sub-unit
W—part of electronically operated sub-unit mainly representing electronic connection pins
X—pressure sensor, in particular PWM-based pressure sensor
402—first pneumatic control chamber
404—first control piston
404.1—extension of first control piston
404.2—fluid flow path laid out within first control piston 404
406—housing
408—predominance volume chamber
408.1—predominance valve piston
408.2—spring within predominance volume chamber 408
AV—additional volume
410—plate valve
412—adjustment screw
412.1—central bore of adjustment screw 412
414—relay piston
416—relay spring
420—silencer
422—linear piston of valve 302
424—metering chamber
426—cylindrical chamber
428—flow orifice 600—commercial or autonomous vehicle
602—towing vehicle
604—towed vehicle
606—pneumatic brake system
608—electronic control unit or ECU
V22—a chamber within TCV connected to port P22
510—valve cap of predominance valve PRV
512—spring of predominance valve PRV
514—first relay piston of trailer brake control module 300c
516—relay valve of trailer brake control module 300c
518—supply pressure receiving chamber of trailer brake control module 300c
520—stopper coupled to first relay piston 514
522—groove to receive stopper 520 at first relay piston 514
524—second relay piston
526—axial extension
528—a contact zone 528 showing between valve seat 530 and lateral extension 532
530—valve seat
532—lateral extension

The invention claimed is:

1. A trailer brake control module (300a; 300b; 300c) for a towing vehicle (502) facilitating braking of a towed vehicle or trailer (504), comprising:
a pressure supply port (P11);
a trailer control pressure port (P22);
a primary control port (P42) for receiving either directly or indirectly a control brake pressure for operating the trailer brake control module (300a; 300b; 300c), wherein the primary control port (P42) receives the control brake pressure from a pneumatically operated supply of pressure medium;
a pneumatic control pressure line (308.1) providing alternative control brake pressure for operating the trailer brake control module (300a; 300b; 300c), wherein the pneumatic control pressure line (308.1) receives the alternative control brake pressure from an electronically operated supply of pressure medium; and
a relay valve (310; 516) that is activated using either:
the control brake pressure received at the primary control port (P42), or
the alternative control brake pressure from the pneumatic control pressure line (308.1),
wherein on activating the relay valve (310), the pneumatic pressure received at the pressure supply port (P11) is connected to the trailer control pressure port (P22),
wherein the trailer brake control module (300a; 300b; 300c) is additionally provided with a braking rate rebalancing unit that maintains the difference of the braking rate between said towing vehicle and said trailer within a permissible threshold range;
wherein the trailer brake control module (300a; 300b; 300c) further comprises a double check or select-high valve (308) for supplying one of the control brake pressure and the alterative control brake pressure depending on the magnitude of each of the brake pressures, wherein the brake pressure which has the higher magnitude is supplied to the relay valve (310).

2. The trailer brake control module (300a; 300b; 300c) of claim 1, wherein the trailer brake control module (300a; 300b; 300c) includes the following ports, which are the only ports provided at a housing of the trailer brake control module:
the primary control port (P42),
a parking brake control port (P43),
the pressure supply port (P11),
the trailer control pressure port (P22),
a trailer supply pressure port (P21), and
a pressure relief port (P3).

3. The trailer brake control module (300a; 300b; 300c) of claim 1, wherein the trailer brake control module (300a; 300b; 300c) further comprises a pneumatically controlled metering valve (302) connecting the pressure supply port (P11) and a trailer supply pressure port (P21), wherein said metering valve (302) operates in first and second positions, wherein in the first position, the metering valve (302) connects the pressure supply port (P11) and the trailer supply pressure port (P21) through a throttled flow orifice, and wherein in the second position, the metering valve (302) connects the pressure supply port (P11) and the trailer supply pressure port (P21) in an invariable and open manner such that the whole of the pneumatic pressure received at the pressure supply port (P11) is transmitted to the trailer supply pressure port (P21).

4. The trailer brake control module (300a; 300b; 300c) of claim 3, wherein the pneumatically controlled metering valve (302) is held in the second position by at least partly pre-existing pressure in the trailer supply pressure port (P21) and a spring (302.3).

5. The trailer brake control module (300a; 300b; 300c) of claim 1, further comprising a first electronically controlled solenoid valve (304) having an inlet (304.1) that is connected to the pressure supply port (P11) and an outlet (304.2) that is selectively connected to the relay valve (310), wherein said outlet (304.2) supplies the alternative control brake pressure.

6. The trailer brake control module (300a; 300b; 300c) of claim 5, wherein the outlet (304.2) carrying the alternative control brake pressure is connected to a first inlet (308.1) of the double check or select-high valve (308), wherein the double check or select-high valve (308) enables the selective connection of the outlet (304.2) with the relay valve (310), when the pressure supplied at the outlet (304.2) is of higher magnitude than the pressure at the primary control port (P42).

7. The trailer brake control module (300a; 300b; 300c) of claim 1, wherein the magnitude of the pressure received at the primary control port (P42) is proportional to the driver's brake demand.

8. The trailer brake control module (300a; 300b; 300c) of claim 1, wherein the trailer brake control module is installed in a pneumatic brake system (606) having an electronic control unit (608) connected to the trailer brake control module (300a; 300b; 300c) to perform brake functions with or without driver brake demand.

9. The trailer brake control module (300a; 300b; 300c) of claim 8, wherein the electronic control unit (608) controls the trailer brake control module (300a; 300b; 300c) such that the braking rate rebalancing unit achieves the maintenance of the difference of the braking rate between said towing vehicle (602) and said towed vehicle (604) within said permissible threshold range.

10. The trailer brake control module (300a; 300b; 300c) of claim 9, wherein the trailer brake control module and pneumatic brake system (606) are installed in a commercial vehicle or an autonomous vehicle (600).

11. A trailer brake control module (300a; 300b; 300c) for a towing vehicle (502) facilitating braking of a towed vehicle or trailer (504), comprising:
a pressure supply port (P11);
a trailer control pressure port (P22);

a primary control port (P42) for receiving either directly or indirectly a control brake pressure for operating the trailer brake control module (300a; 300b; 300c), wherein the primary control port (P42) receives the control brake pressure from a pneumatically operated supply of pressure medium;
a pneumatic control pressure line (308.1) providing alternative control brake pressure for operating the trailer brake control module (300a; 300b; 300c), wherein the pneumatic control pressure line (308.1) receives the alternative control brake pressure from an electronically operated supply of pressure medium; and
a relay valve (310; 516) that is activated using either:
the control brake pressure received at the primary control port (P42), or
the alternative control brake pressure from the pneumatic control pressure line (308.1),
wherein on activating the relay valve (310), the pneumatic pressure received at the pressure supply port (P11) is connected to the trailer control pressure port (P22),
wherein the trailer brake control module (300a; 300b; 300c) is additionally provided with a braking rate rebalancing unit that maintains the difference of the braking rate between said towing vehicle and said trailer within a permissible threshold range;
wherein the braking rate rebalancing unit includes a mechanically operated sub-unit (314 or PRV) that is either coaxially positioned in relation to a central axis (Y-Y') of the trailer brake control module (300a; 300b; 300c) or is positioned perpendicular to said central axis (Y-Y'), wherein said mechanically operated sub-unit (314 or PRV) is at least vertically above the relay valve (310; 516).

12. The trailer brake control module (300a; 300b; 300c) of claim 11, wherein the mechanically operated sub-unit (PRV) is operated such that an initial pressure increase at trailer control pressure port (P22) is accommodated by an additional volume (AV) within the trailer brake control module (300b), wherein the additional volume (AV) is coaxially arranged with and vertically above the relay valve (310) within the trailer brake control module (300b).

13. The trailer brake control module (300a; 300b; 300c) of claim 11, wherein the mechanically operated sub-unit (PRV) operates independently from an electronically controlled sub-unit without disabling the electronically controlled sub-unit.

14. The trailer brake control module (300a; 300b; 300c) of claim 11, wherein the mechanically operated sub-unit is perpendicular to the axis (Y-Y'), wherein the relay valve includes a first relay piston (514) that shifts downward in response to control pressure received in a first pneumatic control chamber from primary control port (P42), wherein the first relay piston is functionally coupled to a second relay piston (524), wherein the second relay piston moves a valve seat (530) and connects a supply pressure receiving chamber (518), connected to the pressure supply port (P11), to a control port pressure chamber (V22) and the trailer control pressure port (P22).

15. The trailer brake control module (300a; 300b; 300c) of claim 11, wherein the mechanically operated sub-unit (PRV) is in addition to an electronically operated sub-unit (W, 304, 306) comprising first and second solenoid valves (304, 306) operable to selectively connect the pressure supply port (P11) to the pneumatic control pressure line (308.1).

16. The trailer brake control module (300a; 300b; 300c) of claim 11, wherein the mechanically operated sub-unit (PRV) is a predominance valve.

17. A trailer brake control module (300a; 300b; 300c) for a towing vehicle (502) facilitating braking of a towed vehicle or trailer (504), comprising:
a pressure supply port (P11);
a trailer control pressure port (P22);
a primary control port (P42) for receiving either directly or indirectly a control brake pressure for operating the trailer brake control module (300a; 300b; 300c), wherein the primary control port (P42) receives the control brake pressure from a pneumatically operated supply of pressure medium;
a pneumatic control pressure line (308.1) providing alternative control brake pressure for operating the trailer brake control module (300a; 300b; 300c), wherein the pneumatic control pressure line (308.1) receives the alternative control brake pressure from an electronically operated supply of pressure medium; and
a relay valve (310; 516) that is activated using either:
the control brake pressure received at the primary control port (P42), or
the alternative control brake pressure from the pneumatic control pressure line (308.1),
wherein on activating the relay valve (310), the pneumatic pressure received at the pressure supply port (P11) is connected to the trailer control pressure port (P22),
wherein the trailer brake control module (300a; 300b; 300c) is additionally provided with a braking rate rebalancing unit that maintains the difference of the braking rate between said towing vehicle and said trailer within a permissible threshold range;
wherein the pressure at the trailer brake control port (P22) is measured using a Pulse Width Modulation (PWM) based pressure sensor.

18. The trailer brake control module (300a; 300b; 300c) of claim 17, wherein the trailer brake control module (300a; 300b; 300c) further comprises a double check or select-high valve (308) for supplying one of the control brake pressure and the alterative control brake pressure depending on the magnitude of each of the brake pressures, wherein the brake pressure which has the higher magnitude is supplied to the relay valve (310).

19. A trailer brake control module (300a; 300b; 300c) for a towing vehicle (502) facilitating braking of a towed vehicle or trailer (504), comprising:
a pressure supply port (P11);
a trailer control pressure port (P22);
a primary control port (P42) for receiving either directly or indirectly a control brake pressure for operating the trailer brake control module (300a; 300b; 300c), wherein the primary control port (P42) receives the control brake pressure from a pneumatically operated supply of pressure medium;
a pneumatic control pressure line (308.1) providing alternative control brake pressure for operating the trailer brake control module (300a; 300b; 300c), wherein the pneumatic control pressure line (308.1) receives the alternative control brake pressure from an electronically operated supply of pressure medium; and
a relay valve (310; 516) that is activated using either:
the control brake pressure received at the primary control port (P42), or
the alternative control brake pressure from the pneumatic control pressure line (308.1), wherein on activating the relay valve (310), the pneumatic pressure received at the pressure supply port (P11) is connected to the trailer control pressure port (P22), wherein the trailer brake control module (300*a*; 300*b*; 300*c*) is additionally provided with a braking rate rebalancing unit that maintains the difference of the braking rate between said towing vehicle and said trailer within a permissible threshold range;

wherein trailer brake control module (300*a*; 300*b*; 300*c*) further comprises a first pneumatic control chamber (402) to which the primary control port (P42) is connected.

20. The trailer brake control module (300*b*; 300*c*) of claim 19, wherein the trailer brake control module (300*b*; 300*c*) further comprises a first control piston (404) separating the first pneumatic control chamber (402) and an additional volume (AV), and wherein the first control piston (404) integrally comprises a fluid flow path (404.2) indirectly connecting the trailer control pressure port (P22) and the additional volume (AV).

* * * * *